United States Patent
Wang et al.

(10) Patent No.: US 9,040,108 B2
(45) Date of Patent: May 26, 2015

(54) DEVICE AND METHOD FOR DECAFFEINATING A LIQUID

(75) Inventors: Guangwei Wang, Shanghai (CN); Declan Patrick Kelly, Shanghai (CN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/343,400

(22) PCT Filed: Sep. 13, 2012

(86) PCT No.: PCT/IB2012/054755
§ 371 (c)(1),
(2), (4) Date: Mar. 7, 2014

(87) PCT Pub. No.: WO2013/046084
PCT Pub. Date: Apr. 4, 2013

(65) Prior Publication Data
US 2014/0220199 A1    Aug. 7, 2014

(30) Foreign Application Priority Data

Sep. 28, 2011 (WO) ................ PCT/CN2011/080275

(51) Int. Cl.
*A23L 1/025* (2006.01)
*A23F 5/22* (2006.01)
*B03C 5/00* (2006.01)
*B03C 5/02* (2006.01)
*A23F 3/38* (2006.01)
*A23F 3/36* (2006.01)

(52) U.S. Cl.
CPC . *A23L 1/025* (2013.01); *A23F 5/22* (2013.01); *B03C 5/005* (2013.01); *B03C 5/026* (2013.01); *A23F 3/38* (2013.01); *A23F 3/36* (2013.01)

(58) Field of Classification Search
CPC ............. A23L 1/025; A23F 3/36; A23F 5/22; A23F 3/38; B03C 5/005; B03C 5/026

USPC ............ 426/239, 495, 478; 99/290; 204/641, 204/630, 555, 554, 661, 665, 672, 660
See application file for complete search history.

(56) References Cited

U.S. PATENT DOCUMENTS

| | | | | |
|---|---|---|---|---|
| 2,089,116 | A | * | 8/1937 | Dyckerhoff ...................... 426/45 |
| 4,508,743 | A | * | 4/1985 | Green et al. ................... 426/422 |
| 5,443,709 | A | | 8/1995 | Crose et al. |
| 5,728,634 | A | * | 3/1998 | Everhart et al. ............... 442/237 |
| 5,914,021 | A | | 6/1999 | Crose et al. |

FOREIGN PATENT DOCUMENTS

| | | |
|---|---|---|
| CH | 0623994 A5 | 7/1981 |
| EP | 2253592 A1 | 11/2010 |
| FR | 2761235 A1 | 10/1998 |
| JP | 6142405 A | 5/1994 |
| WO | 9516358 A1 | 6/1995 |
| WO | 2006108292 A1 | 10/2006 |

OTHER PUBLICATIONS

Sun et al, "A Graphene-Based Electrochemical Sensor for Sensitive Determination of Caffeine" Colloids and Surfaces B: Biointerfaces, vol. 84, 2011, pp. 421-426.

\* cited by examiner

*Primary Examiner* — Anthony Weier

(57) ABSTRACT

The invention proposes a device for decaffeinating a liquid. The device includes at least one cathode electrode and at least one anode electrode which are spaced apart and which are immersed in the liquid; a power supply coupled to the at least one cathode electrode and the at least one anode electrode and configured to apply power thereto, wherein the at least one cathode electrode and the at least one anode electrode are configured to generate an electric field in the liquid upon application of the power to attract caffeine molecules in the liquid to the at least one cathode electrode; wherein the at least one cathode electrode is made of or coated with an absorbing material configured to absorb at least part of the caffeine molecules that are attracted to the at least one cathode electrode.

16 Claims, 2 Drawing Sheets

DEVICE AND METHOD FOR DECAFFEINATING A LIQUID

CROSS-REFERENCE TO PRIOR APPLICATIONS

This application is the U.S. National Phase application under 35 U.S.C. §371 of International Application No. PCT/IB2012/054755, filed on Sep. 13, 2012, which claims the benefit of International Application No. PCT/CN2011/080275, filed on Sep. 28, 2011. These applications are hereby incorporated by reference herein.

FIELD OF THE INVENTION

The present invention relates to decaffeination, particularly to a device and a method for decaffeinating a liquid.

BACKGROUND OF THE INVENTION

Caffeine is a bitter, white crystalline xanthine alkaloid and psychoactive stimulant, which can be found in the seeds, leaves, and fruit of some plants. It is most commonly consumed by humans as an ingredient in infusions extracted from the beans of the coffee plant and the leaves of the tea bush, as well as an ingredient in various foods and drinks containing products derived from the kola nut.

Beverages containing caffeine, such as coffee, tea, soft drinks, and energy drinks, always enjoy great popularity. However, due to health or other concerns, the number of consumers that avoid caffeine ingestion is significant. Therefore, there is a need for brewing decaffeinated beverages or beverage with a low caffeine content to meet various consumer requirements.

U.S. Pat. No. 5,914,021 discloses an apparatus and a method for separating a charged substance, for example coffee molecules, from a conductive fluid, for example coffee, in which the conductive fluid is transported to a charged substance separation assembly where an electrostatic field is imposed to separate the charged substance from the fluid which passes through a porous separator and is collected.

OBJECT AND SUMMARY OF THE INVENTION

According to one aspect, an embodiment of the invention provides a device for decaffeinating a liquid, the device comprising:
at least one cathode electrode and at least one anode electrode which are spaced apart and which are immersed in the liquid;
a power supply coupled to the at least one cathode electrode and the at least one anode electrode and configured to apply power thereto, wherein the at least one cathode electrode and the at least one anode electrode are configured to generate an electric field in the liquid upon application of the power to attract caffeine molecules in the liquid to the at least one cathode electrode;
wherein the at least one cathode electrode is made of or coated with an absorbing material configured to absorb at least part of the caffeine molecules that are attracted to the at least one cathode electrode.

It is well-known that the caffeine molecules in the liquid are bound to H+ ions and thus have positive charges. Upon activation of the power supply, current is provided to the at least one cathode electrode and the at least one anode electrode and thus the electric field in the liquid is generated. Under the effect of the electric field, the positively charged caffeine molecules in the liquid are gradually attracted to the at least one cathode electrode and then concentrated at the at least one cathode electrode. Meanwhile, the absorbing material of the at least one cathode electrode absorbs the caffeine molecules that are attracted to the cathode electrode.

The device enables the desired amount of caffeine molecules in the liquid to be removed, while the resulting liquid substantially maintains the original volume, which effectively avoids the waste of liquid.

Advantageously, the device may further comprise a container, wherein the container includes an inlet which is provided thereon and which is configured to receive the liquid.

Advantageously, the device may further comprise a membrane disposed in the container between the at least one cathode electrode and the at least one anode electrode to define a first chamber adjacent to the at least one cathode electrode and a second chamber adjacent to the at least one anode electrode, and configured to cooperate with the at least one cathode electrode and the at least one anode electrode to separate the liquid into a first part with high caffeine concentration within the first chamber and a second part with low caffeine concentration within the second chamber; wherein the container further includes a first outlet which is in fluid communication with the first chamber and which is configured to drain the first part with high caffeine concentration from the first chamber, and a second outlet which is in fluid communication with the second chamber and which is configured to drain the second part with low caffeine concentration from the second chamber.

The second part with low caffeine concentration collected from the second chamber typically contains no or hardly any caffeine and can be used as the resulting decaffeinated liquid. Furthermore, in this embodiment, as the pouring-in of caffeine-containing liquid and the draining of the decaffeinated liquid are conducted simultaneously, there is no need to size the container such that it can hold all of the caffeine-containing liquid to be treated. As a result, the size of the container, and hence the size of the device, may be reduced, resulting in a more compact coffee maker or tea maker when the device is incorporated into a coffee maker or tea maker, respectively.

According to another aspect, one embodiment of the invention provides an apparatus for brewing a caffeine-containing liquid, the apparatus comprising a device for decaffeinating the liquid as described above.

According to yet another aspect, one embodiment of the invention provides a method of decaffeinating a liquid, the method comprising the steps of:
applying an electric field to the liquid, using at least one cathode electrode and at least one anode electrode, for attracting caffeine molecules to the at least one cathode electrode;
absorbing at least part of the caffeine molecules that are attracted to the at least one cathode electrode, using the at least one cathode electrode, wherein the at least one cathode electrode is made of or coated with an absorbing material.

BRIEF DESCRIPTION OF THE DRAWINGS

The above and other objects and features of the present invention will become more apparent from the following detailed description considered in connection with the accompanying drawings, in which.

Throughout the above drawings, like reference numerals will be understood to refer to like, similar or corresponding features or functions.

DETAILED DESCRIPTION

Reference will now be made to embodiments of the invention, one or more examples of which are illustrated in the figures. The embodiments are provided by way of explanation of the invention, and are not meant as a limitation of the invention. For example, features illustrated or described as part of one embodiment may be used in combination with another embodiment to yield a still further embodiment. It is intended that the invention encompass these and other modifications and variations as come within the scope and spirit of the invention.

The device of the invention for decaffeinating a liquid comprises at least one cathode electrode and at least one anode electrode, which are spaced apart and which are immersed in the liquid; and a power supply coupled to the at least one cathode electrode and the at least one anode electrode and configured to apply power thereto, wherein the at least one cathode electrode and the at least one anode electrode are configured to generate an electric field in the liquid upon the application of the power to attract caffeine molecules in the liquid to the at least one cathode electrode, wherein the at least one cathode electrode is made of or coated with an absorbing material configured to absorb at least part of the caffeine molecules that are attracted to the at least one cathode electrode.

The device and the method of the invention may be applied to decaffeinate any caffeine-containing liquid, such as coffee, tea, cocoa, soft drinks, and energy drinks or any combination of those liquids. The caffeine-containing liquid may also be a non-potable liquid, such as waste water, that must be decaffeinated before being released to the environment.

The level of decaffeination in the invention may be controlled by varying the exposure time of the liquid to the electrochemical reaction, ranging from minimal decaffeination to complete decaffeination, i.e. 100% decaffeination. The period of time necessary to achieve the desired level of decaffeination will vary depending on the conditions and parameters of the electrochemical reaction, which will be described in detail later.

Figure 1:
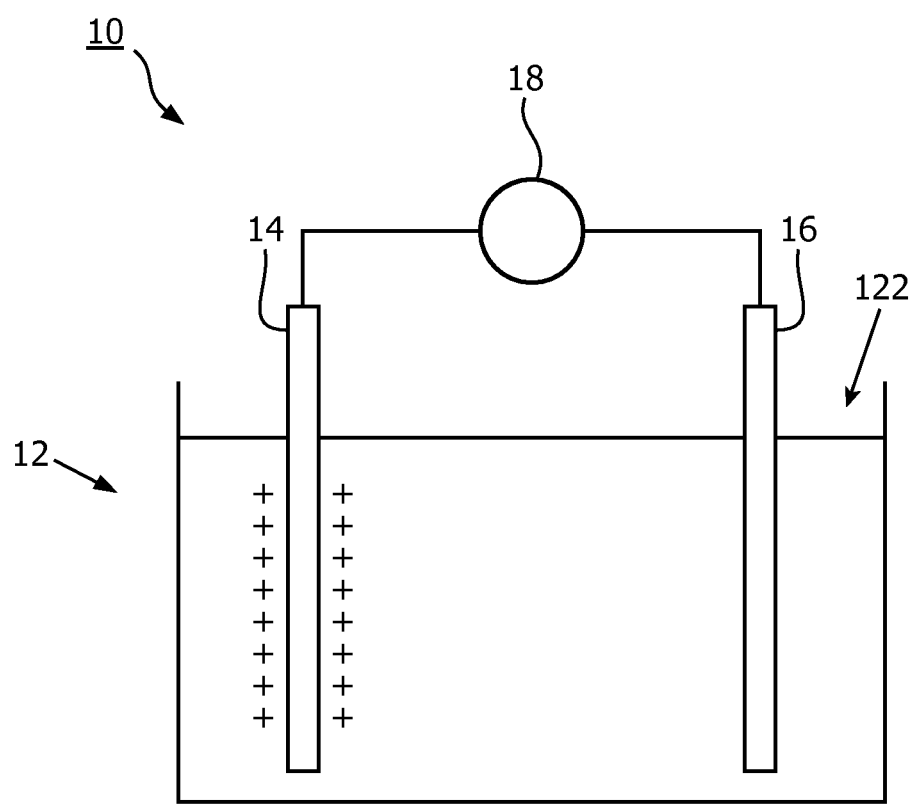
FIG. 1 shows an exemplary device for decaffeination of a liquid according to one embodiment of the invention.

FIG. 1 shows an exemplary device 10 for decaffeinating a liquid according to one embodiment of the invention.

Referring to FIG. 1, the device 10 comprises a container 12 including an inlet 122 for receiving caffeine-containing liquid. The container 12 may be made of a material which is substantially impervious to the caffeine-containing liquid. For the decaffeination of coffee, food grade plastic, for example polyethylene or polypropylene, is desirable.

The device 10 further comprises a cathode electrode 14 and an anode electrode 16 disposed in the container 12 and spaced apart; and a power supply 18 coupled between the cathode electrode 14 and the anode electrode 16 and intended to apply a power thereto. The cathode electrode 14 is made of or coated with an absorbing material capable of absorbing caffeine molecules.

The power supply 18 may be a DC power supply capable of providing constant current, for example. Alternatively, the electrochemical reaction may be powered to operate at a constant potential rather than a constant current.

The anode electrode 16 may be made of any kind of known electrode material, such as platinum, gold, titanium, palladium, iridium, etc.

The absorbing material of the cathode electrodes 14 may be porous carbon material, such as active carbon, carbon nanotube, carbon fiber, carbon paper, or carbon cloth for example; or conductive polymer, such as polyaniline, polythiophene or polypyrrole for example; or ion exchange resin, such as cation exchange resin for example; or inorganic adsorbent, such as active $Al_2O_3$, molecular sieve, zeolite, diatomite, for example.

In the case that the cathode electrode 14 is coated with the absorbing material, the substrate of the cathode electrode 14 may also be made of any kind of known electrode material.

Advantageously, the specific surface area of the absorbing material is sized to absorb a sufficient amount of caffeine molecules. When the lifetime of the absorbing material is reached, the absorbing material should be replaced.

In operation, first, all of the caffeine-containing liquid to be treated is poured into the container 12 through the inlet 122. Upon activation of the power supply 18, current is provided to the cathode electrode 14 and the anode electrode 16, and thus an electric field is generated in the poured-in liquid. Under the effect of the electric field, the caffeine molecules in the poured-in liquid are gradually attracted to the cathode electrode 14 and then concentrated at the cathode electrode 14, denoted by '+'. Meanwhile, the absorbing material of the cathode electrode 14 absorbs the caffeine molecules that are attracted to the cathode electrode 14. After the poured-in liquid has been exposed to the electrochemical reaction for a predetermined duration, the desired amount of caffeine molecules can be removed from the liquid.

The level or degree of decaffeination of the liquid may be controlled by varying the exposure time of the liquid to the electrochemical reaction. In other words, the level or degree of decaffeination varies as a function of the exposure time of the liquid to the electrochemical reaction, ranging from minimal decaffeination to complete decaffeination, i.e. 100% decaffeination.

The rate of decaffeination, i.e. the period of time necessary to cause the desired degree of decaffeination will vary depending on the conditions and parameters of the electrochemical reaction. The conditions and parameters of the electrochemical reaction may be: current/voltage supplied by the power supply 18, specific surface area of the absorbing material, or conductivity of the electrode material of the cathode electrode 14 and anode electrode 16, for example.

The rate of decaffeination is directly proportional to the current/voltage supplied by the power supply 18. The smaller the current/voltage, the longer the time before the desired level of decaffeination has been reached.

The specific surface area of the absorbing material also affects the rate of decaffeination in a directly proportional way. The rate of decaffeination is increased as the specific surface area of the absorbing material is increased.

The rate of decaffeination is also directly proportional to the conductivity of the electrode material of the cathode electrode 14 and anode electrode 14. An increase in conductivity of the electrode material results in a decrease of the time required to reach the desired level of decaffeination.

It is to be noted that the decaffeination of the liquid may be conducted using a single pair of electrodes, for example, the cathode electrode 14 and the anode electrode 16 as shown in FIG. 1, or alternatively by using a plurality of cathode electrodes and a plurality of anode electrodes. Those skilled in the art may appreciate that the use of a plurality of pairs of electrodes results in a greater degradation rate of caffeine due to an increase of the reactive electrode surface area.

The device 10 of FIG. 1 may be incorporated into a coffee maker or a tea maker for example, to receive and decaffeinate the brewed coffee or tea.

It shall be appreciated that, in an alternative embodiment, the device 10 of FIG. 1 may not include the container 12. In this regard, the cathode electrode 14 and anode electrode 16 as well as the power supply 18 may be directly incorporated into a decaffeination chamber, for containing the brewed coffee or tea, of the coffee maker or the tea maker.

Table 1 shows experimental results of the use of the device of FIG. 1 to decaffeinate caffeine-containing liquid, wherein the cathode electrode 14 is made of active carbon and is disc shaped, approximately 3.5 cm across and 1 cm thick.

TABLE 1

| Parameters | | | Caffeine concentration (mg/ml) | | Caffeine |
|---|---|---|---|---|---|
| Time (min) | Voltage (v) | Current (A) | Orignal liquid | liquid after decaffeination | decrement (%) |
| 5 | 20 | 0.17 | 0.940 | 0.862 | 8.30 |
| 10 | 20 | 0.17 | 0.940 | 0.827 | 12.0 |
| 5 | 30 | 1.25 | 0.993 | 0.826 | 16.8 |

As can be seen from table 1, for a given current and voltage, the level or degree of decaffeination increases as the exposure time of the liquid to the electrochemical reaction is increased. Further, for a given exposure time, the increases of current and voltage result in a greater degradation of caffeine.

Figure 2:
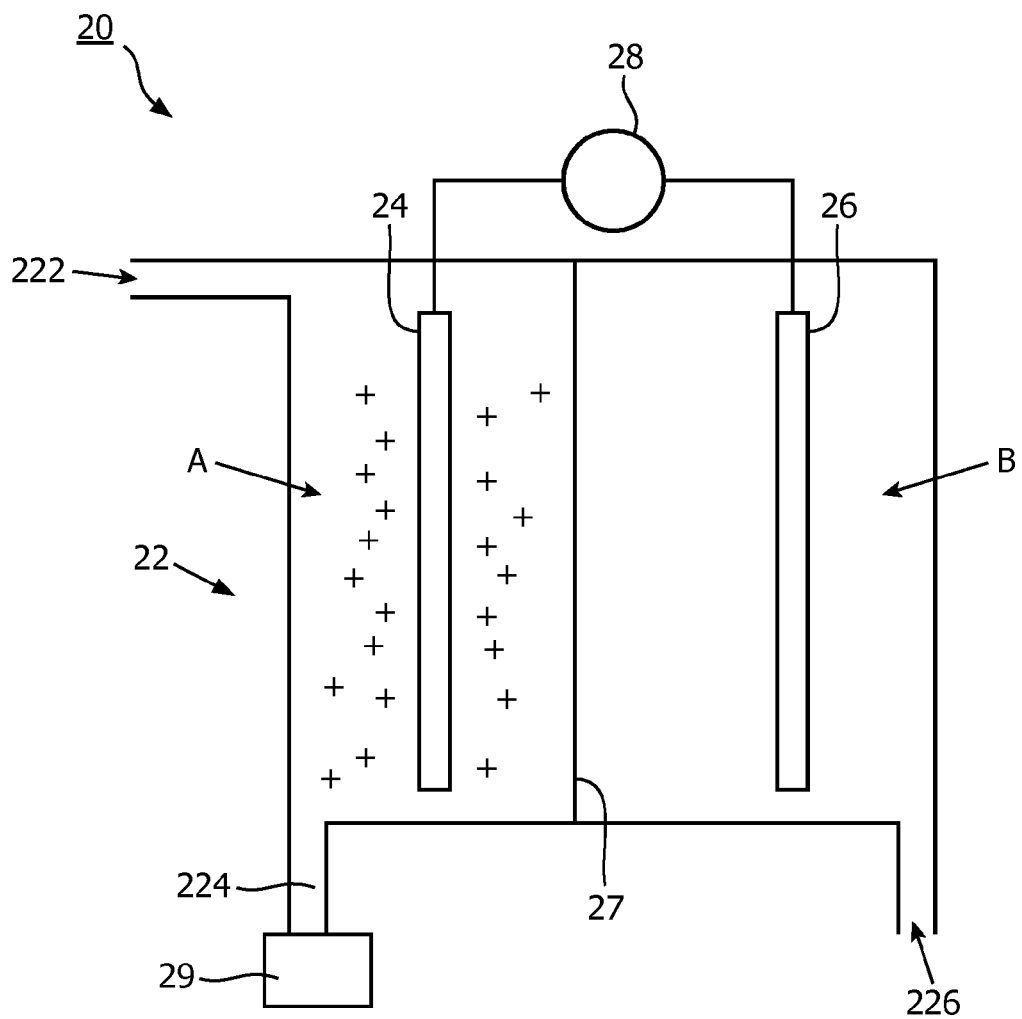
FIG. 2 shows an exemplary device for decaffeinating a liquid according to another embodiment of the invention.

FIG. 2 shows an exemplary device 20 for decaffeinating a liquid according to another embodiment of the invention.

Referring to FIG. 2, the device 20 comprises a container 22; a cathode electrode 24 and an anode electrode 26 disposed in the container 22 and spaced apart; a power supply 28 coupled between the cathode electrode 24 and the anode electrode 26 and intended to apply electric power thereto. The cathode electrode 24 is made of or coated with an absorbing material capable of absorbing caffeine molecules. The configurations and/or material of the container 22, the cathode anode 24, the anode electrode 26 and the power supply 28 may be the same as in FIG. 1, which will not be described here for conciseness.

The device 20 further comprises a membrane 27 disposed in the container 22 between the cathode electrode 24 and the anode electrode 26 to define a first chamber A in which the cathode electrode 24 is located and a second chamber B in which the anode electrode 26 is located. The membrane 27 may be disposed at any position between the cathode electrode 24 and the anode electrode 26. Advantageously, the membrane 27 is disposed adjacent to the cathode electrode 24.

An inlet 222 is disposed on the container 22 to receive the caffeine-containing liquid to be treated. When the inlet 222 is in fluid communication with the first chamber A, as shown in FIG. 2, the membrane 27 may be an anionic membrane which prevents caffeine molecules in the liquid within the first chamber A from passing therethrough to the second chamber B upon activation of the power supply 28. Otherwise, when the inlet 222 is in fluid communication with the second chamber B, the membrane 27 is a cationic membrane which allows caffeine molecules in the liquid within the second chamber B to pass therethrough to the first chamber A upon activation of the power supply 28. It will be appreciated that another kind of membrane may also be used here, such as an ultrafiltration membrane or a nanofiltration membrane for example, which can be used to physically limit diffusion of caffeine molecules.

A first outlet 224 and a second outlet 226 are disposed on the container 22. The first outlet 224 is in fluid communication with the first chamber A to drain the liquid from the first chamber A. The second outlet 226 is in fluid communication with the second chamber B to drain the liquid from the second chamber B.

The size of the first outlet 224 and the second outlet 226 may be determined on the basis of the required flow rate of the liquid drained from the first chamber A and the required flow rate of the liquid drained from the second chamber B.

In operation, the caffeine-containing liquid is poured into the container 22 through the inlet 222. The poured-in liquid gradually flows from the first chamber A to the second chamber B to balance the liquid level between the first chamber A and the second chamber B, while the caffeine molecules in the poured-in liquid are retained within the first chamber A by the anionic membrane 27 disposed between the cathode electrode 24 and the anode electrode 26. Meanwhile, the electric field generated in the poured-in liquid attracts the caffeine molecules in the poured-in liquid to the cathode electrode 24, and the absorbing material of the cathode electrode 24 absorbs the caffeine molecules that are attracted to the cathode electrode 24.

In this embodiment, as the pouring-in of the caffeine-containing liquid and the draining of the decaffeinated liquid are conducted simultaneously, when the caffeine-containing liquid is continuously poured into the container 22 through the inlet 222, the flow of the liquid in the container 22 weakens the electric-field force to some extent, thereby forcing some of the caffeine molecules that are attracted to the cathode electrode 24 to flow away from the cathode electrode 24 and diffuse in the poured-in liquid. The anionic membrane 27 disposed between the cathode electrode 24 and the anode electrode 26 restricts or prevents those caffeine molecules from passing therethrough to the second chamber B; therefore, during the continuous pouring-in and draining process, the liquid in the container 22 is always separated into two parts by the anionic membrane 27, i.e. the first part with high caffeine concentration within the first chamber A and the second part with low caffeine concentration within the second part B. The first part with high caffeine concentration is drained from the first chamber A through the first outlet 224, and the second part with low caffeine concentration is drained from the second chamber B.

The above operations are performed consecutively until all caffeine-containing liquid to be treated has been decaffeinated.

The second part with low caffeine concentration collected from the second chamber B typically contains no or hardly any caffeine, and can be directly used as the resulting decaffeinated liquid.

As the absorbing material of the cathode electrode 24 absorbs part of the caffeine molecules within the first chamber A, the first part with a high caffeine concentration collected from the first chamber A contains less caffeine than the caffeine-containing liquid to be treated, which can be used as a low-caffeine liquid.

To further reduce the amount of caffeine molecules in the first part with a high caffeine concentration collected from the first chamber A, in an alternative embodiment, the device 20 may further comprise a filter 29 disposed beneath or within the first outlet 224 to absorb at least part of the caffeine molecules in the first part with high caffeine concentration when the first part with high caffeine concentration is drained from the first chamber A through the first outlet 224. The filter 29 may be made of carbon-based adsorbent, ion exchange resin, polymer, gel or the like. Finally, the filtered first part may be mixed with the second part as the resulting decaffeinated liquid.

The device 20 of FIG. 2 may be incorporated into a coffee maker or a tea maker for example, to receive and decaffeinate the brewed coffee or tea.

In this embodiment, as the pouring-in of the caffeine-containing liquid and the draining of the decaffeinated liquid are conducted simultaneously, there is no need to size the container 22 such that it can hold all caffeine-containing liquid. As a result, the size of the container 22, and thus the size of the device 20 may be reduced, resulting in a more compact coffee maker or tea maker when the device is incorporated into a coffee maker and tea maker.

Figure 3:
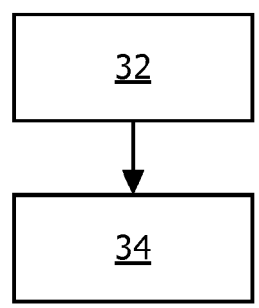
FIG. 3 shows a flow chart of a method of decaffeinating a liquid according to one embodiment of the invention.

According to another aspect, one embodiment of the invention further provides a method of decaffeinating a liquid. FIG. 3 shows a flow chart of a method of decaffeinating a liquid.

The method comprises a step S32 of applying an electric field to the liquid using at least one cathode electrode and at least one anode electrode, for attracting caffeine molecules to the at least one cathode electrode.

The method further comprises a step S34 of absorbing at least part of the caffeine molecules that are attracted to the at least one cathode electrode using the at least one cathode electrode, wherein the at least one cathode electrode is made of or coated with an absorbing material.

The absorbing material may be porous carbon material, such as active carbon, carbon nanotube, carbon fiber, carbon paper, or carbon cloth for example; or conductive polymer, such as polyaniline, polythiophene or polypyrrole for example; or ion exchange resin, such as cation exchange resin for example; or inorganic adsorbent, such as active $Al_2O_3$, molecular sieve, zeolite, diatomite for example.

Advantageously, the method may further comprise a step of separating the liquid into a first part with high caffeine concentration and a second part with low caffeine concentration using a membrane disposed between the at least one cathode electrode and the at least one anode electrode and cooperating with the at least one cathode electrode and the at least one anode electrode.

The membrane may be an anionic membrane or a cationic membrane.

It should be noted that the above described embodiments are given for describing rather than limiting the invention, and it is to be understood that modifications and variations may be resorted to without departing from the spirit and scope of the invention as those skilled in the art readily understand. Such modifications and variations are considered to be within the scope of the invention and the appended claims. The protective scope of the invention is defined by the accompanying claims. In addition, any of the reference numerals in the claims should not be interpreted as a limitation to the claims. Use of the verb "comprise" and its conjugations does not exclude the presence of elements or steps other than those stated in a claim. The indefinite article "a" or "an" preceding an element or step does not exclude the presence of a plurality of such elements or steps.

What is claimed is:

1. A device for decaffeinating a liquid, the device comprising:
    at least one cathode electrode and at least one anode electrode spaced apart from one another and being immersed in the liquid; and
    a power supply coupled to the at least one cathode electrode and the at least one anode electrode and configured to apply a power thereto, wherein the at least one cathode electrode and the at least one anode electrode are configured to generate an electrical field in the liquid upon application of the power to attract caffeine molecules in the liquid to the at least one cathode electrode,
    wherein the at least one cathode electrode is made of or coated with an absorbing material configured to absorb at least part of the caffeine molecules that are attracted to the at least one cathode electrode, said absorbing material comprises one of porous carbon material, conductive polymer and inorganic adsorbent.

2. The device of claim 1, further comprising a container, wherein the container includes an inlet disposed thereon and configured to receive the liquid.

3. The device of claim 1, further comprising a membrane disposed in the container between the at least one cathode electrode and the at least one anode electrode to define a first chamber adjacent to the at least one cathode electrode and a second chamber adjacent to the at least one anode electrode, and configured to cooperate with the at least one cathode electrode and the at least one anode electrode to separate the liquid into a first part with high caffeine concentration within the first chamber and a second part with low caffeine concentration within the second chamber,
    wherein the container further includes a first outlet disposed in fluid communication with the first chamber and configured to drain the first part with high caffeine concentration out of the first chamber, and a second outlet disposed in fluid communication with the second chamber and configured to drain the second part with low caffeine concentration out of the second chamber.

4. The device of claim 3, wherein when the inlet is disposed in fluid communication with the first chamber, the membrane is an anionic membrane configured to prevent caffeine molecules in the liquid within the first chamber from passing therethrough to the second chamber; and
    when the inlet is disposed in fluid communication with the second chamber, the membrane is a cationic membrane configured to allow caffeine molecules in the liquid within the second chamber to pass therethrough to the first chamber.

5. The device of claim 3, further comprising a filter disposed beneath or in the first outlet configured to absorb at least part of caffeine molecules in the first part with high caffeine concentration when the first part with high caffeine concentration is drained out of the first chamber through the first outlet.

6. The device of claim 5, wherein the filter is made of one of: carbon-based adsorbent, ion exchange resin, polymer, and gel.

7. An apparatus for brewing a caffeine-containing liquid, comprising a device for decaffeinating the liquid as claimed in claim 1.

8. A method of decaffeinating a liquid, the method comprising acts of:
    providing an electrical field in the liquid using at least one cathode electrode immersed in the liquid and at least one anode electrode immersed in the liquid, for attracting caffeine molecules to the at least one cathode electrode;
    absorbing at least part of the caffeine molecules that are attracted to the at least one cathode electrode using the at least one cathode electrode, wherein the at least one cathode electrode is made of or coated with an absorbing material, said absorbing material comprises one of porous carbon material, conductive polymer and inorganic adsorbent.

9. The method of claim 8, further comprising an act of:
separating the liquid into a first part with high caffeine concentration and a second part with low caffeine concentration using a membrane disposed between the at least one cathode electrode and the at least one anode electrode by cooperating with the at least one cathode electrode and the at least one anode electrode.

10. The method of claim 9, wherein the membrane is one of: an anionic membrane and a cationic membrane.

11. An apparatus for brewing a caffeine-containing liquid, the apparatus comprising:
at least one cathode electrode and at least one anode electrode spaced apart from one another and being immersed in the liquid; and
a power supply coupled to the at least one cathode electrode and the at least one anode electrode and configured to apply a power thereto, wherein the at least one cathode electrode and the at least one anode electrode are configured to generate an electrical field in the liquid upon application of the power to attract caffeine molecules in the liquid to the at least one cathode electrode,;
wherein the at least one cathode electrode is made of or coated with an absorbing material configured to absorb at least part of the caffeine molecules that are attracted to the at least one cathode electrode.

12. The apparatus of claim 11, further comprising a container, wherein the container includes an inlet disposed thereon and configured to receive the liquid.

13. The device of claim 11, further comprising a membrane disposed in the container between the at least one cathode electrode and the at least one anode electrode to define a first chamber adjacent to the at least one cathode electrode and a second chamber adjacent to the at least one anode electrode, and configured to cooperate with the at least one cathode electrode and the at least one anode electrode to separate the liquid into a first part with high caffeine concentration within the first chamber and a second part with low caffeine concentration within the second chamber,
wherein the container further includes a first outlet disposed in fluid communication with the first chamber and configured to drain the first part with high caffeine concentration out of the first chamber, and a second outlet disposed in fluid communication with the second chamber and configured to drain the second part with low caffeine concentration out of the second chamber.

14. The device of claim 13, wherein when the inlet is disposed in fluid communication with the first chamber, the membrane is an anionic membrane configured to prevent caffeine molecules in the liquid within the first chamber from passing therethrough to the second chamber; and
when the inlet is disposed in fluid communication with the second chamber, the membrane is a cationic membrane configured to allow caffeine molecules in the liquid within the second chamber to pass therethrough to the first chamber.

15. The apparatus of claim 13, further comprising a filter disposed beneath or in the first outlet configured to absorb at least part of caffeine molecules in the first part with high caffeine concentration when the first part with high caffeine concentration is drained out of the first chamber through the first outlet.

16. The apparatus of claim 15, wherein the filter is made of one of: carbon-based adsorbent, ion exchange resin, polymer, and gel.

* * * * *